2,929,760

INSECTICIDAL COMPOSITION COMPRISING PYRETHRINS AND OCTACHLORODIPROPYLETHER

Friedrich Becke, Bad Duerkheim, Heinrich Sperber, Ludwigshafen (Rhine), Herbert Stummeyer, Mannheim, and Heinrich Adolphi, Limburgerhof, Pfalz, Germany, assignors to Badische Anilin- & Soda-Fabrik Aktiengesellschaft, Ludwigshafen (Rhine), Germany No Drawing. Application November 16, 1956
Serial No. 622,521

Claims priority, application Germany November 24, 1955

1 Claim. (Cl. 167—24)

This invention relates to insecticidal compositions and is particularly concerned with spray materials suitable for combating insects.

It is known that certain aliphatic ethers containing chlorine have insecticidal action. Among these beta.beta'-dichloro-diethyl ether and also alkyl-1.2.2.3-tetrachlor-normal-butyl ether are especially prominent. It is only with one of the numerous halogen-containing aliphatic ethers the use of which as insecticides has been hitherto considered, namely beta-beta'-dichloro-diethyl ether, that it has been possible to establish a synergistic action with respect to insecticides.

We have now found that ethers of the general formula $$CX_{n+1}CX_nCH_2OCH_2CX_nCX_{n+1}$$

(in which X is H or Cl and $n$ is 1 or 2) which contain at least 4 chlorine atoms in the molecule, have a remarkable synergistic action with respect to insecticides of the class of synthetic and natural pyrethrins and of rotenone. These ethers can be prepared in good yields by known methods. For example 2.3.3.3.2'.3'.3'.3'-octachloro-dipropyl ether is readily accessible by the reaction of trichloro-ethylene with alpha-alpha'-dichloro-dimethyl ether.

The said compounds have themselves a certain insecticidal action and only a slight toxicity with respect to warm-blooded animals. Of more practical importance, however, is their synergistic action in admixture with the above-mentioned insecticides, in particular the pyrethrins.

As compared with the known pyrethin synergists, as for example piperonyl butoxide, the activity of for example 2.3.3.3.2'.3'.3'.3'-octachloro-dipropyl ether is about the same; the cost of the latter is however only a fraction of the cost of piperonyl butoxide.

The following examples will further illustrate the action and mode of employment of the synergists according to this invention, but the invention is not restricted to these examples. The parts specified are parts by weight.

EXAMPLE 1

For the production of a domestic insect spray, 0.2 part of allethrin and 1 part of octachloro-dipropyl ether of the formula $CCl_3$—CHCl—$CH_2$—O—$CH_2$—CHCl—$CCl_3$ are dissolved under pressure or at low temperature in 98.8 parts of vinyl chloride. This mixture, for example charged into spray-tins, is a suitable agent for combating Muscidae, Culicidae and other insect pests. It has the same effect as a solution of allethrin and piperonyl butoxide of the same concentration in vinyl chloride.

EXAMPLE 2

An equally active spray for combating domestic insect pests is a solution of 0.2 part of pyrethrum and 2 parts of 2,3,3,2',3',3'-hexachlorodiallyl ether of the formula $CCl_2$=CCl—$CH_2$—O—$CH_2$—CCl=$CCl_2$ in 97.8 parts of vinyl chloride.

EXAMPLE 3

For comparison with the known synergist piperonyl butoxide, a series of biological tests were carried out. Tables I and II show the results of experiments to test the synergistic action of octachlorodipropyl ether of the formula $CCl_3$—CHCl—$CH_2$—O—$CH_2$—CHCl—$CCl_3$ in comparison with pyrethrum. In the first series of tests (see Table I) the concentrations of solutions of the same activity are determined. As test animals, imagoes of Musca domestica were used, to which in each case 1 cubic millimeter of acetone solution of the active substance of the given concentration was applied to the ventral abdomen. The concentrations of the solutions were chosen so that the mortality after 4 hours at a temperature of 20° C. amounts in each case to 50% (lethal dose 50).

Table I

| | | |
|---|---|---|
| pyrethrum | LD 50 | 0.012% |
| pyrethrum+octachlorodipropyl ether 1:5 (with reference to pyrethrum) | LD 50 | 0.005% |
| pyrethrum+octachlorodipropyl ether 1:5 (with reference to total active substance) | LD 50 | 0.03% |

Table II

| | Action after 10 minutes, percent | Action after 1 hour, percent |
|---|---|---|
| pyrethrum 0.0125% | 4 | 6 |
| pyrethrum 0.0125%+octachlorodipropyl ether 0.0625% | 20 | 19 |
| pyrethrum 0.025% | 11 | 16 |
| pyrethrum 0.025%+octachlorodipropyl ether 0.125% | 40 | 68 |
| pyrethrum 0.05% | 19 | 31 |

Table II shows the action of solutions of different content of active substance on Musca domestica in spray tests in boxes having an edge length of 50 centimeters. In each case 5 cubic centimeters of a solution in ethyl chloride of the given concentration were used. The two tables clearly manifest the synergistic action of octachlorodipropyl ether.

Table III shows the results of tests from which it is clearly evident that the synergistic action of octachlorodipropyl ether and of hexachlorodiallyl ether is equal to the action of piperonyl butoxide. In the tests, the given amounts of the solutions were used in boxes having an edge length of 50 centimeters at 20° C. on two-day-old imagoes of Musca domestica.

A ratio of insecticides to synergist of 1:5 and 1:10 was used. The determination of the activity took place by counting the animals in the supine position after 10 minutes or 4 hours.

Table III

| Active substance | Synergist | Solvent | Amount used, cc. | Action after 10 minutes, percent | Action after 4 hours, percent |
|---|---|---|---|---|---|
| 0.025% allethrin | 0.125% octachlorodipropyl ether | ethylene chloride | 5 | 48 | 54 |
| Do | 0.125% piperonyl butoxide | do | 5 | 50 | 55 |
| 0.0125% pyrethrum | 0.0625% octachlorodipropyl ether | gas oil | 1 | 95 | 97 |
| Do | 0.0625% piperonyl butoxide | do | 1 | 80 | 97 |
| Do | 0.125% hexachlorodiallyl ether | do | 0.5 | 97 | 97 |
| Do | 0.125% piperonyl butoxide | do | 0.5 | 100 | 84 |

What we claim is:

An insecticidal composition comprising pyrethrins and, as a synergist, 2,3,3,3,2',3',3',3'-octachlorodipropylether.

References Cited in the file of this patent

UNITED STATES PATENTS 1,954,517   Bousquet _____ Apr. 10, 1937